May 19, 1931.  E. L. JOSEPH  1,806,400
FILTER FOR AIR AND OTHER GASES
Filed Feb. 25, 1930
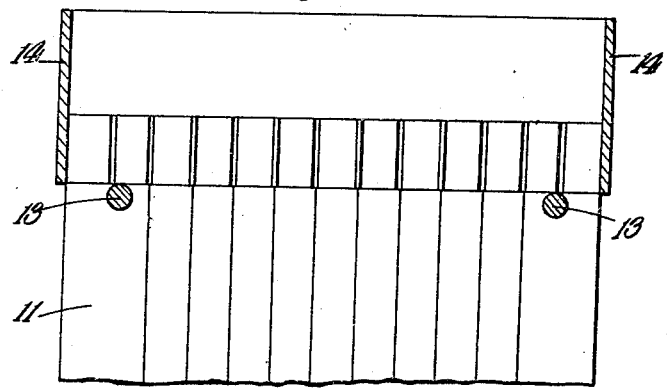
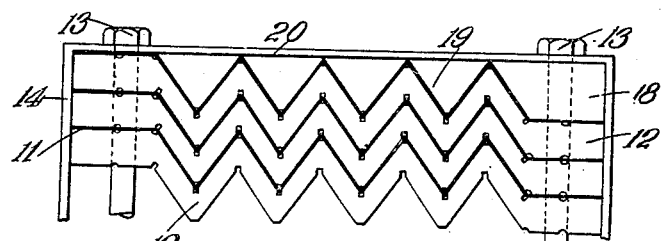
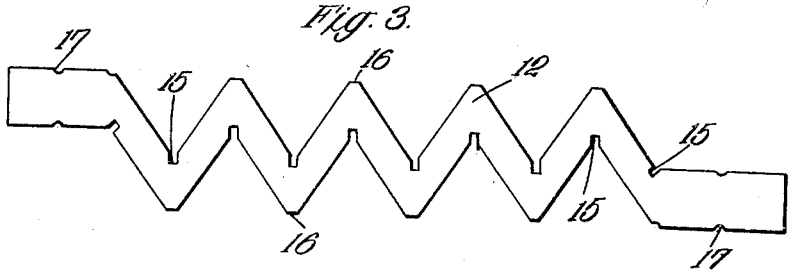
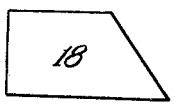 

Patented May 19, 1931

1,806,400

UNITED STATES PATENT OFFICE

EDWARD LIONEL JOSEPH, OF WESTMINSTER, ENGLAND

FILTER FOR AIR AND OTHER GASES

Application filed February 25, 1930, Serial No. 431,093, and in Great Britain April 24, 1929.

In the specification of my prior Letters Patent No. 1,695,237 of December 11, 1928, is described a filter for air or other gases comprising a series of corrugated, crimped or similar metal plates superposed in spatial relationship and supported within an inner frame so as to form sinuous passages, said inner frame being removably mounted in an outer frame or the like in order that said inner frame and plates may be dipped into a heavy viscous oil, glycerine, or the like, adapted to retain solid matter in the air or gas.

It has since been proposed to arrange the metal plates with their general planes vertical and with their upper ends projecting through the apertured bottom of a tank arranged over the assemblage so that a thin film of heavy viscous oil, glycerine or the like, may be allowed to pass through said apertured bottom and flow down over, and clean adherent solid matter from said plates.

According to the present invention the apertured bottom of the tank is constituted by the upper ends of the plates themselves and by suitably grooved or otherwise apertured spacer bars alternating with, and clamped in position between, said plates. For instance if the plates be formed with V-shaped corrugations vertical grooves or channels may be formed in the spacer bars at their reentrant angles, and gaps formed by truncating their salient angles, whilst if the vertical margins of said plates be formed without corrugations grooves or channels may be formed at the straight ends of the spacer bars.

Referring to the accompanying drawings which illustrate one form of the invention; Figure 1 is a part sectional side elevation; Figure 2 is a part plan of Figure 1; Figure 3 is a plan of a spacer bar to an enlarged scale, and Figure 4 shows spacer elements to be mounted between the side of the tank and the adjacent plate.

A number of plates 11 are arranged in spatial relationship by means of spacer bars 12, the plates and bars being formed into a rigid unit by means of clamping bolts 13. A tank 14 is formed over the unit thus provided, so that the plates 11 and spacer bars 12 constitute the bottom of the tank.

The spacer bars are grooved or formed with channels 15 at their re-entrant angles and at their salient angles are truncated, as at 16, to form gaps at the re-entrant angles of the plates 11, while additional grooves 17 may be formed in their straight portions.

It will be seen that, when the unit is built up the base of the tank is formed with a number of perforations, which permit the passage therethrough of oil or other liquid placed in the tank. A second tank (not shown) may be placed at the lowermost end of the plates to receive the liquid percolating through the perforations and passing down said plates. In order to space the plates adjacent to the end walls of the tank corner, trapezoidal spacer members 18 and side triangular spacing members 19, are arranged between the last corrugated plates 11 and flat plates such as 20.

The film of liquid, preferably a viscous oil, formed on the plates, is cleaned by supplying liquid to the upper tank, whence it percolates through the perforations in the false bottom thereof spreads out on, and runs down, the surfaces of the plates and passes into the tank at the bottom. For convenience the oil in the lower tank is pumped up to the upper tank in any suitable manner at required intervals.

The air or gas to be filtered is passed through the bank of plates, passing across the films of oil on the surfaces thereof, and is caused to follow an irregular path by the corrugations, in order to ensure that the air or gas current will come into contact with the maximum surface of plates.

Any impurities in the air or gas such as particles of dust or the like, will be retained in the film of oil, and eventually carried to the lower tank, wherein by allowing the oil to stand, the impurities will sink to the bottom.

When recharging the upper tank from the lower tank, it may happen that some of the impurities will also pass to the upper tank, and whilst the cross-sectional area of each channel must be such that the oil or the like will not flow therethrough too rapidly, it must not be so small as to render said channels liable to become choked by said impurities.

I claim:—

1. A filter for air or like fluids comprising a tank, a series of deformed metal plates arranged in spatial relationship with their general planes vertical, a series of grooved spacer bars corresponding in configuration with the deformation of said plates arranged in alternation with said plates at the upper ends of the latter, and means for clamping together said plates and said spacer bars, said spacer bars and the upper edges of said plates constituting a perforated bottom for said tank, inlets for fluid to be filtered between the lateral edges of said plates at one side of the assemblage and outlets for filtered fluid at the other side of the assemblage.

2. A filter for air or like fluids comprising a tank, a series of deformed metal plates presenting salient and reentrant angles arranged in spatial relationship with their general planes vertical, a series of grooved spacer bars corresponding in configuration with the deformation of said plates arranged in alternation with said plates at the upper ends of the latter and means for clamping together said plates and said spacer bars, said spacer bars and the upper edges of said plates constituting a perforated bottom for said tank, inlets for fluid to be filtered between the lateral edges of said plates at one side of the assemblage and outlets for filtered fluid at the other side of the assemblage.

3. A filter for air or like fluids comprising a tank, a series of deformed metal plates presenting salient and reentrant angles arranged in spatial relationship with their general planes vertical, a series of spacer bars presenting salient and reentrant angles and corresponding in configuration with the deformation of said plates arranged in alternation with said plates at the upper ends of the latter, said spacer bars being truncated at their salient angles and notched at their reentrant angles, and means for clamping together said plates and said spacer bars, said spacer bars and the upper edges of said plates constituting a perforated bottom for said tank, inlets for fluid to be filtered between the lateral edges of said plates at one side of the assemblage and outlets for filtered fluid at the other side of the assemblage.

EDWARD LIONEL JOSEPH.